(12) United States Patent
Angilella et al.

(10) Patent No.: US 12,131,592 B2
(45) Date of Patent: Oct. 29, 2024

(54) ACOUSTIC HEALTH USAGE AND MONITORING SYSTEM OF MECHANICAL AUTOMOTIVE SUBSYSTEMS

(71) Applicant: The MITRE Corporation, McLean, VA (US)

(72) Inventors: Alexander Joseph Angilella, Lexington, MA (US); Justin Edward Tufariello, Concord, MA (US); Leslie Allison Riesenhuber, Great Falls, VA (US); Paul Francis Kelley, Westwood, MA (US); Jesse Moore, Boston, MA (US)

(73) Assignee: THE MITRE CORPORATION, McLean, VA (US)

( * ) Notice: Subject to any disclaimer, the term of this patent is extended or adjusted under 35 U.S.C. 154(b) by 430 days.

(21) Appl. No.: 17/473,494

(22) Filed: Sep. 13, 2021

(65) Prior Publication Data

US 2023/0080002 A1     Mar. 16, 2023

(51) Int. Cl.
*G07C 5/08* (2006.01)
*B60G 7/00* (2006.01)
(Continued)

(52) U.S. Cl.
CPC .......... *G07C 5/0808* (2013.01); *B60G 7/005* (2013.01); *G01M 17/04* (2013.01); *G06N 20/00* (2019.01);
(Continued)

(58) Field of Classification Search
CPC .............. B60G 7/005; B60G 17/0185; B60G 2400/10; B60G 2400/90; B60G 2800/802;
(Continued)

(56) References Cited

U.S. PATENT DOCUMENTS

| 4,843,885 A | 7/1989 | Bambara |
| 5,932,801 A | 8/1999 | Akishita et al. |

(Continued)

FOREIGN PATENT DOCUMENTS

| CN | 105675306 B | 8/2018 | |
| EP | 3808619 A1 * | 4/2021 | ............ B60T 17/221 |

(Continued)

OTHER PUBLICATIONS

"Hybrid Design For Rods And Ball Joints.", Emre Kuvvet, TR 201310132 A2, Aug. 21, 2014 (Year: 2014).*
"Ball-and-Socket Joint for a Motor Vehicle", Spratte et al., WO 2007009419 A1, Date published: Jan. 25, 2007 (Year: 2007).*

*Primary Examiner* — John H Le
(74) *Attorney, Agent, or Firm* — Sterne, Kessler, Goldstein & Fox P.L.L.C.

(57) ABSTRACT

Disclosed herein are system, method, and computer program product embodiments for detecting potentially unsafe wear levels in vehicle suspension systems. An embodiment operates by receiving acoustic signals of a vehicle suspension system, processing, the acoustic signals to generate training data, training a predictive learning algorithm to generate a predictive wear model and classifying the processed acoustic signals to indicate wear levels of one or more components of the vehicle suspension system. The trained predictive wear model subsequently predicts wear levels of the vehicle suspension system for notification to a cloud-based repository. Fleets of driverless vehicles may continuously monitor wear levels for timely maintenance before failure occurs.

18 Claims, 10 Drawing Sheets

(51) Int. Cl.
*G01M 17/04* (2006.01)
*G06N 20/00* (2019.01)
*G07C 5/00* (2006.01)
*H04R 3/04* (2006.01)

(52) U.S. Cl.
CPC ............ *G07C 5/006* (2013.01); *G07C 5/008* (2013.01); *H04R 3/04* (2013.01)

(58) Field of Classification Search
CPC .... B60G 2204/416; G06N 20/00; G06N 7/01; G06N 3/08; G07C 5/006; G07C 5/008; G07C 5/0808; H04R 3/04; H04R 2201/003; G01M 17/04
USPC .......................................................... 702/34
See application file for complete search history.

(56) References Cited

U.S. PATENT DOCUMENTS

| | | |
|---|---|---|
| 6,925,879 B2 | 8/2005 | Raichle |
| 9,835,594 B2 | 12/2017 | Yoskovitz et al. |
| 2016/0343180 A1 | 11/2016 | Talwar et al. |

FOREIGN PATENT DOCUMENTS

| | | | | |
|---|---|---|---|---|
| FR | 3066853 A1 | 11/2018 | | |
| KR | 20050011919 A | 1/2005 | | |
| KR | 20060008401 A | 1/2006 | | |
| WO | WO-2018137920 A1 * | 8/2018 | ........... | B60C 11/243 |

* cited by examiner

ACOUSTIC HEALTH USAGE AND MONITORING SYSTEM OF MECHANICAL AUTOMOTIVE SUBSYSTEMS

BACKGROUND

Field

The present invention relates to a system for using electronic devices (e.g., microphones, acceleration sensors, Micro-ElectroMechanical System (MEMS) devices, etc.) to detect and locate mechanical faults in motor vehicles. The present invention further relates to a system for detecting wear in vehicle suspension components, such as ball joints.

Accidents caused by mechanical vehicle failure cost Americans billions of dollars annually. The center for disease control (CDC) indicates that these types of accidents are a leading cause of death and injury in the US. A conventional approach to detecting mechanical failure is to schedule maintenance checks. Once a problem has been discovered, additional diagnostics or repairs may be performed. However, none of these approaches provide technical solutions for early detection of potential mechanical failures.

SUMMARY

Provided herein are system, apparatus, device, method and/or computer program product embodiments, and/or combinations and sub-combinations thereof, for using electronic devices (e.g., microphones, acceleration sensors, Micro-ElectroMechanical System (MEMS) devices, etc.) to detect and locate mechanical faults in motor vehicles. This system works by continuously monitoring (executing on a processing device) acoustic signals (sound signals) generated within a vehicle frame or sub frame. As parts wear, metal-on-metal contact occurs in various components, such as, bushings, ball joints, and brake pads. These sounds may introduce altered acoustic signatures. As will be described in detail hereafter, signal processing techniques may resolve differences in the acoustic signatures to identify outliers that indicate a mechanical fault or anticipate an upcoming mechanical fault (e.g., wear indication). As self-driving vehicles continue to emerge in the marketplace, the usual heuristics drivers use to detect mechanical wear issues will change. A system to detect mechanical issues in the suspension and wheel hub assembly will enhance vehicle maintenance, efficiency, and safety.

In some embodiments, the technology described herein is relevant to commercial vehicles, for example, those found in the trucking industry. Suspension failures in consumer vehicles are rare and generally occur out of the warranty period. Commercial trucks, however, often experience failures. This may be due to stressed use (e.g., weight, road conditions, weather, etc.), more miles driven, and more wheels per vehicle. A value proposition for truck manufacturers and fleet owners is that identifying failures before they occur and organizing repair items at a forward location can reduce downtime and boost profits.

In some embodiments, the technology described herein is relevant to consumer vehicles. Millions of cars are sold in the U.S. every year. Specifically, over 4 million light-duty vehicles were sold in the U.S. in 2019. This technology may follow the lead of previous safety technologies and be initially offered as optional equipment before becoming required standard equipment after action by the National Highway Traffic Safety Administration (NHTSA).

In some embodiments, the technology described herein may use acoustic sensors to test healthy and damaged ball joints and compare acoustic data. Testing may be performed by a test apparatus to actuate healthy and damaged joints at different speeds, recognizing a data spectrum across a variety of ball joints, while introducing controlled damage. Once acoustic data is collected, it is processed to look for detectable differences in healthy vs. damaged joints.

In some embodiments, the technology described herein embeds sensors that continuously monitoring suspension noises and using signal processing techniques to extract failure points/elements. In addition, the continuous monitoring may, in some embodiments, include active learning (e.g., machine learning). Active learning may tune a predictive algorithm that robustly distinguishes failures from road noises, seasonal changes, and the overall aging of the vehicle's subsystems. An ability to predict failures and move repair items to a forward location can save on downtime. The usefulness of this technology applies to commercial timesaving and consumer safety by capturing and characterizing an unpredictable and noisy nature of the vehicle sound environment. In some embodiments, permanently embedded sensors make portable chassis ears used to detect sounds obsolete.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

A system for diagnostic health monitoring of vehicles (e.g., self-driving) as disclosed herein may, in some embodiments, recognize symptoms of failing suspension systems, such as ball joints by differentiating: a clunking noise from suspension issues, excessive vibration originating from a vehicle's suspension, uneven wear on front tires and steering drifts.

Figure 1:
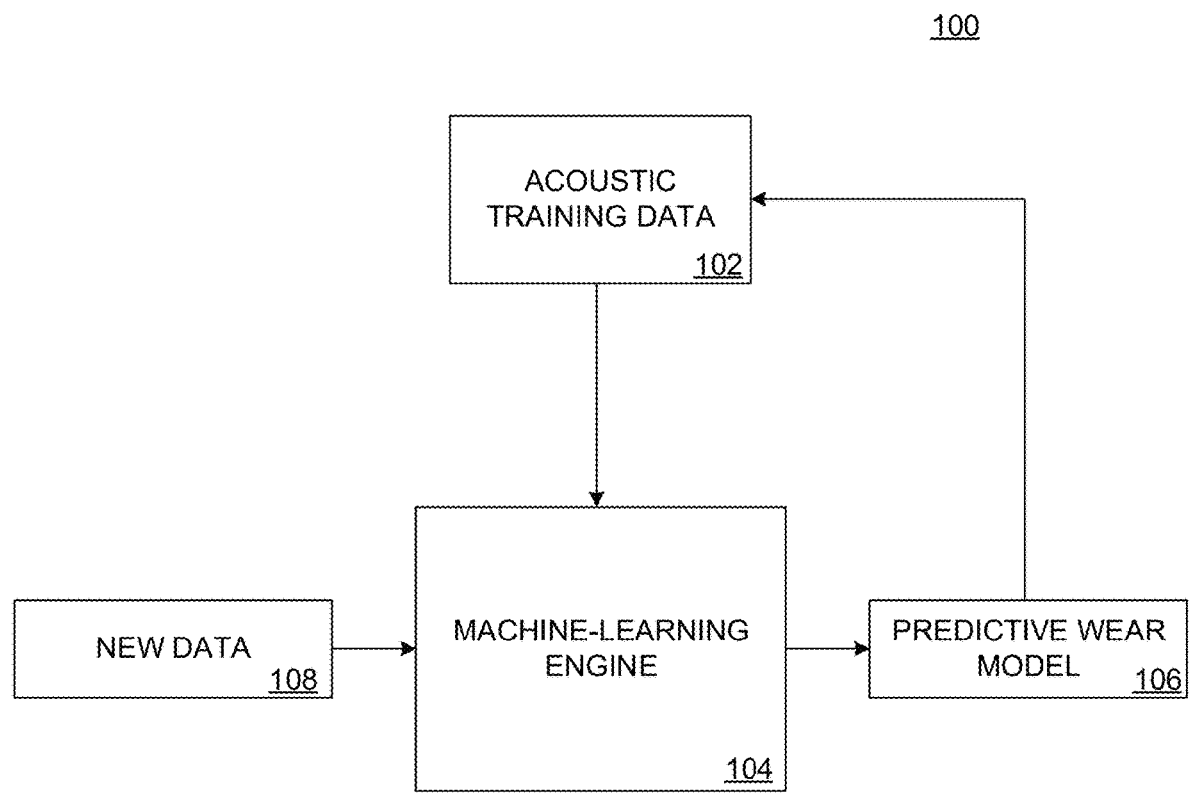
FIG. 1 is a block diagram of a machine learning system, according to some embodiments.

FIG. 1 a machine learning system 100, according to some embodiments. In machine learning, a common task is the study and construction of algorithms that can learn from and make predictions on data. Such algorithms function by making data-driven predictions or decisions, through building a mathematical model from input data. Machine learning (ML) involves computers discovering how they can perform tasks without being explicitly programmed to do so. It involves a machine learning engine 104 learning from input acoustic training data set 102 that performs certain tasks (e.g., teaching the machine learning system about mechanical wear acoustic signatures).

A predictive wear model 106 uses statistics to predict outcomes. Most often, the event one wants to predict is in the future, but predictive modeling may be applied to any type of unknown event, regardless of when it occurred. In many cases, the model may be chosen on the basis of detection theory to try to guess the probability of an outcome given a set amount of input data. In one example, provided an acoustic signature the predictive model may determine how likely that the acoustic signature represents a critical wear level. Predictive models can use one or more classifiers to determine a probability of a set of data belonging to another set.

Machine learning approaches are traditionally divided into three broad categories, depending on the nature of the "signal" or "feedback" available to the learning system: supervised learning, unsupervised learning, and reinforcement learning. In a first category, supervised learning, machine learning engine 104 is presented with input acoustic training data set 102 including example inputs and their desired outputs, given by a "teacher", and the goal is to learn a general rule that maps inputs to outputs. In a second category, unsupervised learning, no labels are given to the learning algorithm, leaving the ML system on its own to find structure in its input. Unsupervised learning can be a goal in itself (discovering hidden patterns in data) or a means towards an end (feature learning). In a third category, reinforcement learning, a computer program interacts with a dynamic environment in which it must perform a certain goal (such as driving a vehicle or playing a game against an opponent). As it navigates its problem space, the program is provided feedback analogous to rewards, which it tries to maximize.

A model may be initially fit to an acoustic training data set 102, which is a set of examples used to fit the parameters (e.g. weights of connections between neurons in artificial neural networks) of the model. The model (e.g., a neural net or a naive Bayes classifier) may be trained on the training dataset using a supervised learning method, for example using optimization methods such as gradient descent or stochastic gradient descent. In practice, the training dataset often consists of pairs of an input vector (or scalar) and the corresponding output vector (or scalar), where the answer key is commonly denoted as the target (or label). The current predictive wear model 106 may be executed with the training dataset and produces a result (e.g., detected wear and/or detected wear level), which is then compared with the target, for each input vector in the training dataset. Based on the result of the comparison and the specific learning algorithm being used, the parameters of the model are adjusted (tuned). Feedback from the predictive wear model may be fed back to the training data to improve the model during future training iterations.

Successively, the fitted model may be used to predict the responses for the observations in a second dataset called the validation dataset (development dataset). The validation dataset provides an unbiased evaluation of a model fit on the training dataset while tuning the model's hyper-parameters (e.g., the number of hidden units—layers and layer widths—in a neural network).

Finally, the test dataset may include new data 108 used to provide an unbiased evaluation of a final predictive model 106 fit on the training data. The testing data should follow the same probability distribution as the training data. New data 108 also includes future sound data to be analyzed by the system to predict wear and/or a level of wear of mechanical sub-systems (e.g., suspension, ball joints, brakes, control arms, tires, etc.) associated with the sound data (e.g., localized microphones capture acoustic signatures of one or more sub-systems).

Figure 2:
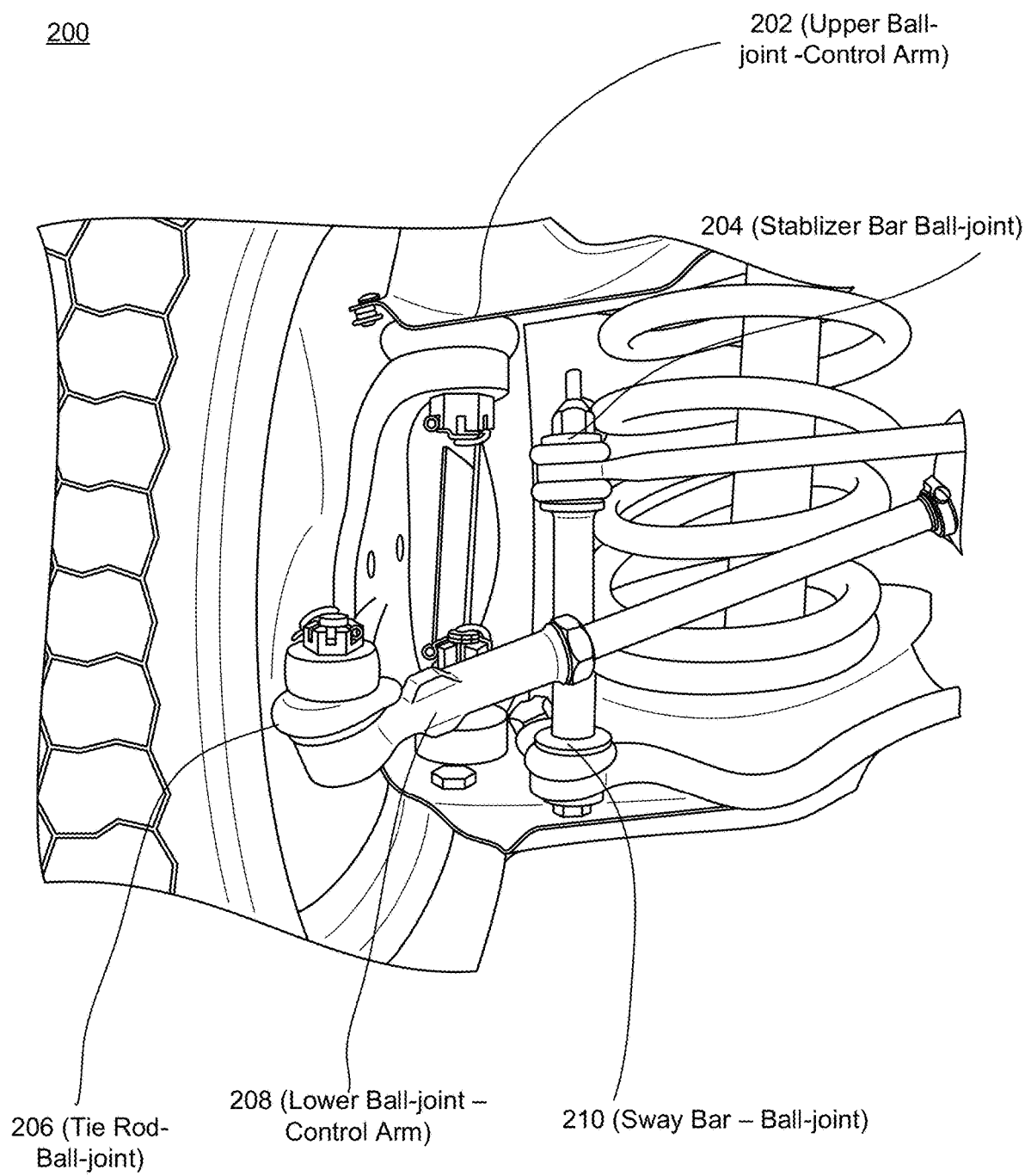
FIG. 2 is an illustration of a vehicle suspensions system, according to some embodiments.

FIG. 2 illustrates an example vehicle suspension system, according to some embodiments.

While described hereafter in an example ball joint application embodiment, the technology described may be equally applied to various vehicle mechanical systems producing detectable sound characteristics upon reaching a failure or wear threshold.

Vehicle suspensions may vary from vehicle to vehicle and even within different model lines of a vehicle (e.g., light-duty to heavy-duty trucks). While FIG. 2 illustrates an example suspension system 200 with steering linkage, the technology described herein is applicable to any suspension variations. In some embodiments, suspensions that include one or more ball joints are described in greater detail. In an automobile, ball joints are sealed spherical bearings that connect components that undergo relative translation and rotation, and are used on virtually every vehicle made. Ball joints connect control arms and tie rods to steering knuckles. A ball joint consists of a bearing stud and socket enclosed in a casing: all these parts are conventionally made of steel. The bearing stud is tapered and threaded, and fits into a tapered hole in the steering knuckle. A protective encasing prevents dirt from getting into the joint assembly. Usually, this is a rubber-like boot that allows movement and expansion of lubricant. Motion-control ball joints may be retained with an internal spring, which helps to prevent vibration problems in the linkage. The ball joint allows movement in systems where thermal expansion and contraction, shock, seismic motion, and torsional motions, and forces are present.

On modern vehicles, joints are the pivot between the wheels and the suspension of an automobile. Conventionally, they are used in the front suspension, but can also be found in the rear suspension of some vehicles (e.g., high performance). Ball joints play a critical role in the safe operation of an automobile's steering and suspension.

Suspension variations may be based on size of the vehicle, gross weight, intended road conditions, performance requirements and specific manufacture design. However, common elements include an upper control arm with upper ball joint 202 and a lower control arm with lower ball joint 208. Lower ball joints may be larger and may wear out faster, because of fore and aft loads, primarily due to braking, which are higher at the bottom ball joint (torque reaction and drag add at the bottom joint, and partly cancel at the top joint.) In addition, lateral cornering loads are higher at the bottom joint. Depending on the suspension design, the vertical load from the suspension spring may be handled entirely by the top ball joint, or entirely by the bottom ball joint. A damper load, (which is low in normal conditions, zero when stationary, but in peak bump or rebound rate may be almost as large as the spring load) is usually, but not always, taken on the same ball joint as the spring load.

An anti-roll bar (sway bar with ball joint 210 in conjunction with stabilizer bar with ball joint 204) is usually a torsion spring that resists body roll motions. It is usually constructed out of a cylindrical steel bar, formed into a "U" shape, which connects to the body at two points, and at the left and right sides of the suspension. If the left and right wheels move together, the bar rotates about its mounting points. If the wheels move relative to each other, the bar is subjected to torsion and forced to twist. Each end of the bar is connected to an end link through a flexible joint, usually a ball joint. The sway bar end link connects in turn to a spot near a wheel or axle, transferring forces from a heavily loaded axle to the opposite side. Forces are therefore transferred from the heavily loaded axle to the connected end link via a bushing to the anti-sway (torsion) bar via a flexible joint to the connected end link on the opposite side of the vehicle to the opposite axle. The bar resists the torsion through its stiffness. The stiffness of an anti-roll bar is proportional to the stiffness of the material, the fourth power of its radius, and the inverse of the length of the lever arms (i.e., the shorter the lever arm, the stiffer the bar). Stiffness is also related to the geometry of the mounting points and the rigidity of the bar's mounting points. The stiffer the bar, the more force required to move the left and right wheels relative to each other. This increases the amount of force required to make the body roll.

Steering linkages connected to the suspension may include tie rods with ball joint 206. A steering linkage is the part of an automotive steering system that conventionally connects to the front wheels. The steering linkage, which connects the steering gearbox to the front wheels, consists of a number of rods. These rods are connected with a socket arrangement similar to ball joint 206, called a tie rod end, allowing the linkage to move back and forth freely so that the steering effort will not interfere with the vehicles up-and-down motion as the wheel moves over roads. The steering gears are attached to a rear rod, which moves when the steering wheel is turned. The rear rod is supported at one end.

When the various ball joints of the suspension and associated steering linkages wear, they may produce sounds that vary from a normal (e.g., new) ball joint. For example, spiked, increasingly loud or repetitive sound signatures may be analyzed and correlated to determine wear patterns that vary from minor initial noise signatures to complete failure noise signatures. Detecting wear patterns before they reach complete failure, within a designated safe margin, may allow for timely repairs. Replacing these ball joints, at this point in the lifetime of a ball joint, may prevent breakdowns or even accidents from loss of steering control.

Figure 3:
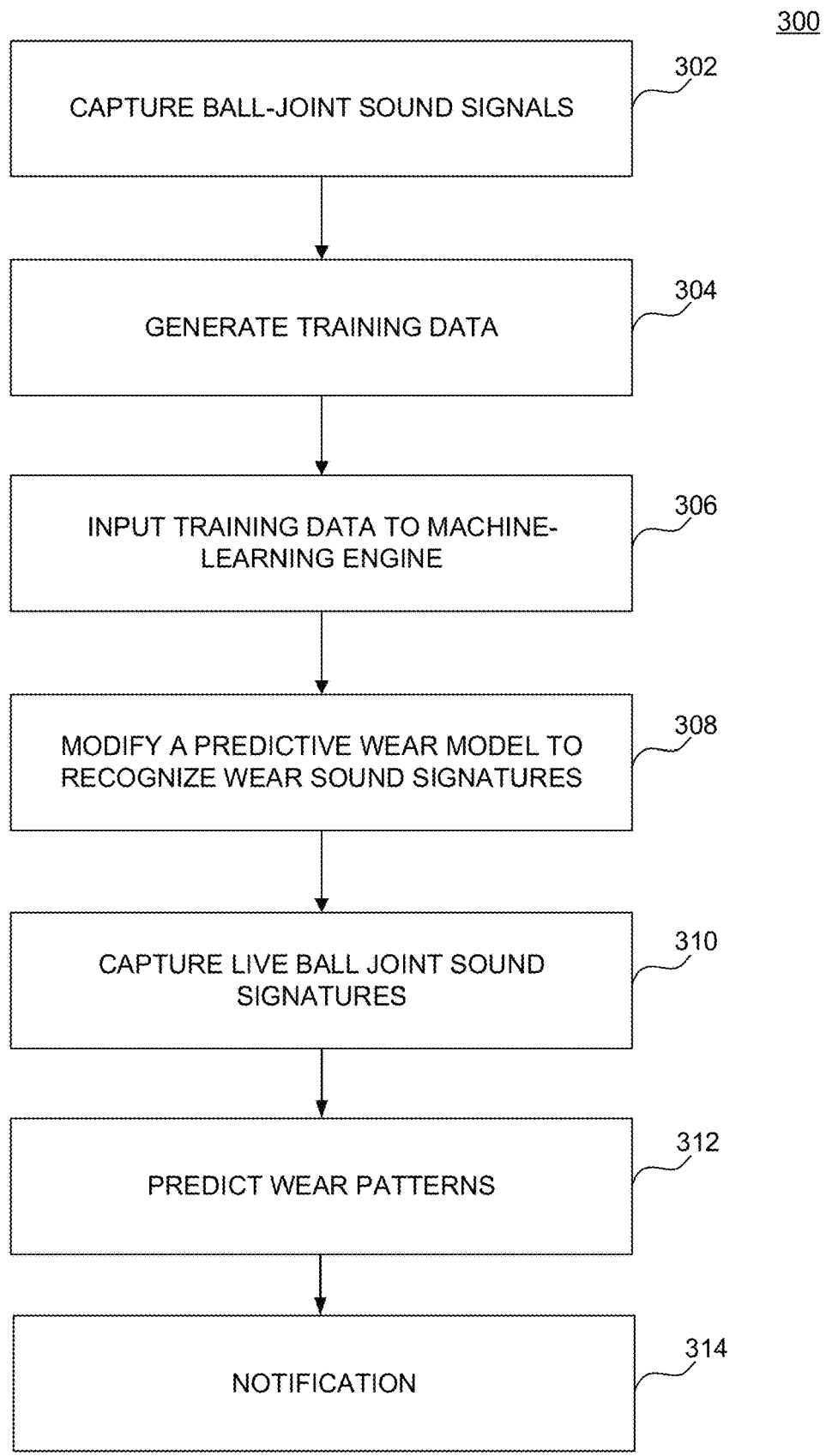
FIG. 3 is a block diagram of a process for predicting wear patterns for a mechanical automotive subsystem, according to some embodiments.

FIG. 3 is a flowchart for a method 300 for acoustic health monitoring of a vehicle, according to an embodiment. Method 300 can be performed by processing logic that can comprise hardware (e.g., circuitry, dedicated logic, programmable logic, microcode, etc.), software (e.g., instructions, or a combination thereof. The processing may be performed locally (within the vehicle) or remotely in cloud-based processors. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment.

A power spectrum of a time series describes a distribution of power into frequency components composing that signal. According to Fourier analysis, any physical signal can be decomposed into a number of discrete frequencies or a spectrum of frequencies over a continuous range. The statistical average of a certain signal or sort of signal (including noise) as analyzed in terms of its frequency content is called its spectrum.

When the energy of the signal is concentrated around a finite time interval, especially if its total energy is finite, one may compute the energy spectral density. More commonly used is the power spectral density (or simply power spectrum), which applies to signals existing over all time, or over a time period large enough (especially in relation to the duration of a measurement) that it could as well have been over an infinite time interval. The power spectral density (PSD) then refers to the spectral energy distribution that would be found per unit of time, since the total energy of such a signal over all time would generally be infinite. Summation or integration of the spectral components yields the total power (for a physical process) or variance (in a statistical process), identical to what would be obtained by integrating $x^2(t)$ over the time domain.

The spectrum of a physical process $x(t)$ often contains essential information about the nature of x. Obtaining a spectrum from time series such as these involves the Fourier transform, and generalizations based on Fourier analysis.

Data is collected in a data collection stage. Electronic devices (e.g., microphones, acceleration sensors, Micro-ElectroMechanical System (MEMS) devices, etc.) detect mechanical faults in motor vehicles. This system works by continuously monitoring (executing on a processing device) acoustic signals generated, for example, within a vehicle frame or sub-frame. As parts wear, metal-on-metal contact occurs in various components, such as, bushings, ball joints, and brake pads. These sounds may introduce altered acoustic signatures. Data collection of data sets of these acoustic signatures may be improved by capturing an end user's requirements, determining the data needs to be collected, and determining how any given data is going to contribute to the predictive model. Based on the data collection results, data sources may be allocated, and data sets can subsequently be acquired from different sources. For example, captured ball joint sound signatures from a variety of ball joint configurations, vehicles, and levels of wear (damage) may be used to train the machine learning system 100 to predict wear severity levels over time.

A data processing/preparation stage ingests data sets 302 from the data collection stage. During the data processing/preparation stage, raw data will first be extracted, transformed, and loaded into a data store (e.g., database (DB), not shown). This stage includes processing to clean up the data—for example, removing empty/null values, detecting outliers, and converting data types. Data processing is performed in conjunction with exploratory data analysis (EDA) to appropriately understand the data, discover relationships and correlations between data, and determine which features may be useful (feature extraction). Useful features are those that have predictive capability (produce high correlation) in a predictive model. In this stage, the training data is processed (generated) 304. The training data, in a supervised learning model, identifies features (e.g., frequency ranges) that map to a result (e.g., worn or damaged suspension elements). In other words, the system is trained by input vectors (sound signals) and corresponding output vectors (acoustic signatures labelled as damage/worn suspension parts). Specific processing elements are discussed in detail in association with FIG. 4. Data preprocessing, wrangling, and feature engineering may be implemented using, for example, Structured Query Language (SQL) queries.

However, not all data fields are directly suitable for machine learning model inputs, which require proper encoding. In the data processing stage, features are selected and weighted (higher/lower value relative to other selected features). For example, not all values are in the correct numerical scale and not all data shall bear the same weights as model inputs.

A modeling stage may include building/modifying a machine learning model 308 using the processed data as training data input 306 to a machine learning algorithm of a machine learning engine 104. For example, a model is built that can evaluate (infer) for different evolving characteristics (e.g., wear patterns) of various ball joint wear conditions (e.g., wear levels). One example would be a supervised learning approach involving logistic regression and random forest methods.

A model evaluation and tuning stage provides evaluation of the predictive wear model 106 after training where the machine learning model is evaluated by several metrics/scores and tuned for performance (if applicable). For classification models, metrics can include accuracy, precision, recall, and area under a receiver operating characteristics (ROC) curve. If the model performance is insufficient, processing may be redirected to the fine-tuning stage to reevaluate and further clean data, select new features for the model, or obtain additional data. The model deployment and monitoring stage includes deploying the trained and tuned machine learning model in production. Once deployed, the system may test against newly captured acoustic signatures (e.g., live ball joint sound signatures 310) in unsupervised learning and monitor to ensure that the model is correctly predicting its target variable. In other words, the predictive wear model correctly predicts wear patterns 312 within a range of values. However, if the model performance decreases, then the model can be retuned or rebuilt, followed by a subsequent model evaluation.

For wear patterns reaching failure or approaching a failure threshold, the system may provide a notification 314 to an owner/business associated with the vehicle. For example, a fleet of driverless vehicles may continuously update a cloud-based repository of current wear patterns of each ball joint in each vehicle in the fleet and further schedule maintenance/repairs based on the wear patterns and geographic location (e.g., nearest authorized repair center).

Figure 4:
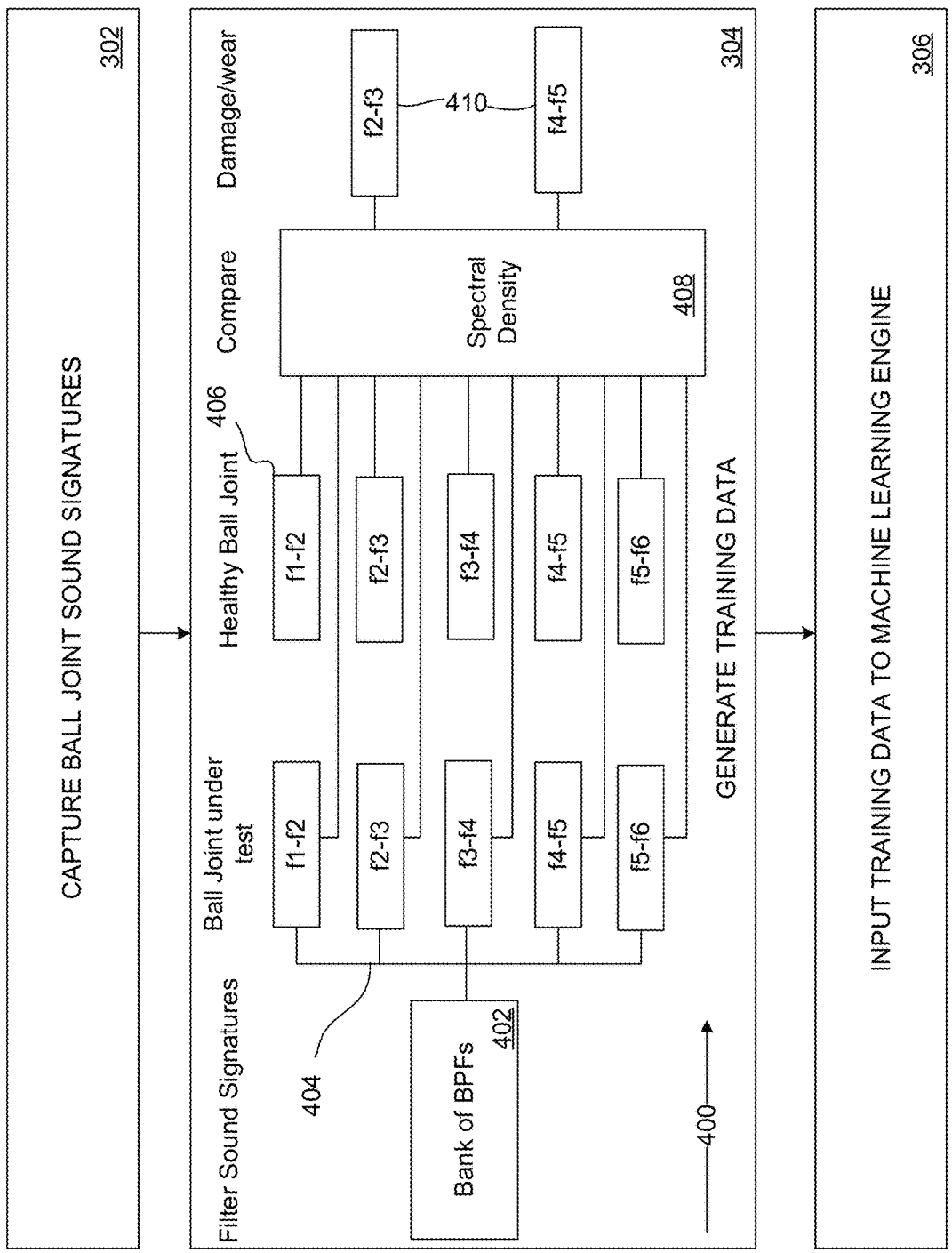
FIG. 4 is a block diagram of a process for predicting wear patterns for a mechanical automotive subsystem, according to some embodiments.

FIG. 4 is a block diagram of a method for predicting wear patterns for a mechanical automotive subsystem, according to some embodiments.

Method 400 can be performed by processing logic that can comprise hardware (e.g., circuitry, dedicated logic, programmable logic, microcode, etc.), software (e.g., instructions, or a combination thereof. The processing may be performed locally (within the vehicle) or remotely in cloud-based processors. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIG. 3. However, method 400 is not limited to that example embodiment.

In one example embodiment, acoustic signatures captured by microphones are input to a processing stage to generate training data 304 for machine learning system 100. Alternately, the acoustic signatures may be pre-stored acoustic data. The ball joint acoustic (sound) signatures are filtered by a bank of band pass filters (BPFs) 402 to separate an acoustic signature into frequency bands or ranges (f1-f2, f2-f3, f3-f4, f4-f5, f5-f6, etc.) where acoustic abnormalities, based on wear (damage), may be detected. A spectral density 408 (power spectral density) of each of the frequency ranges of a ball joint under test 404 is compared against a spectral density of the same frequency ranges of a known healthy ball joint (e.g., new/smooth) 406. This comparison may identify one or more frequency ranges 410 with detectable acoustic abnormalities (e.g., low frequency noise signatures or sharp spikes of noise, etc.). For a supervised training data set, the input vector is the sound signature and the output (teacher) vector is a level of wear (damage) physically present with the ball joint under test (as detected in the one or more frequency bands). The generated training data is then iteratively fed as an input to training the predictive wear model using machine learning engine 104.

FIGS. 5-9 illustrate various ball joint testing results. These figures are to be recognized as example results and therefore do not include all suspension, ball joint and condition variations.

Figure 5:
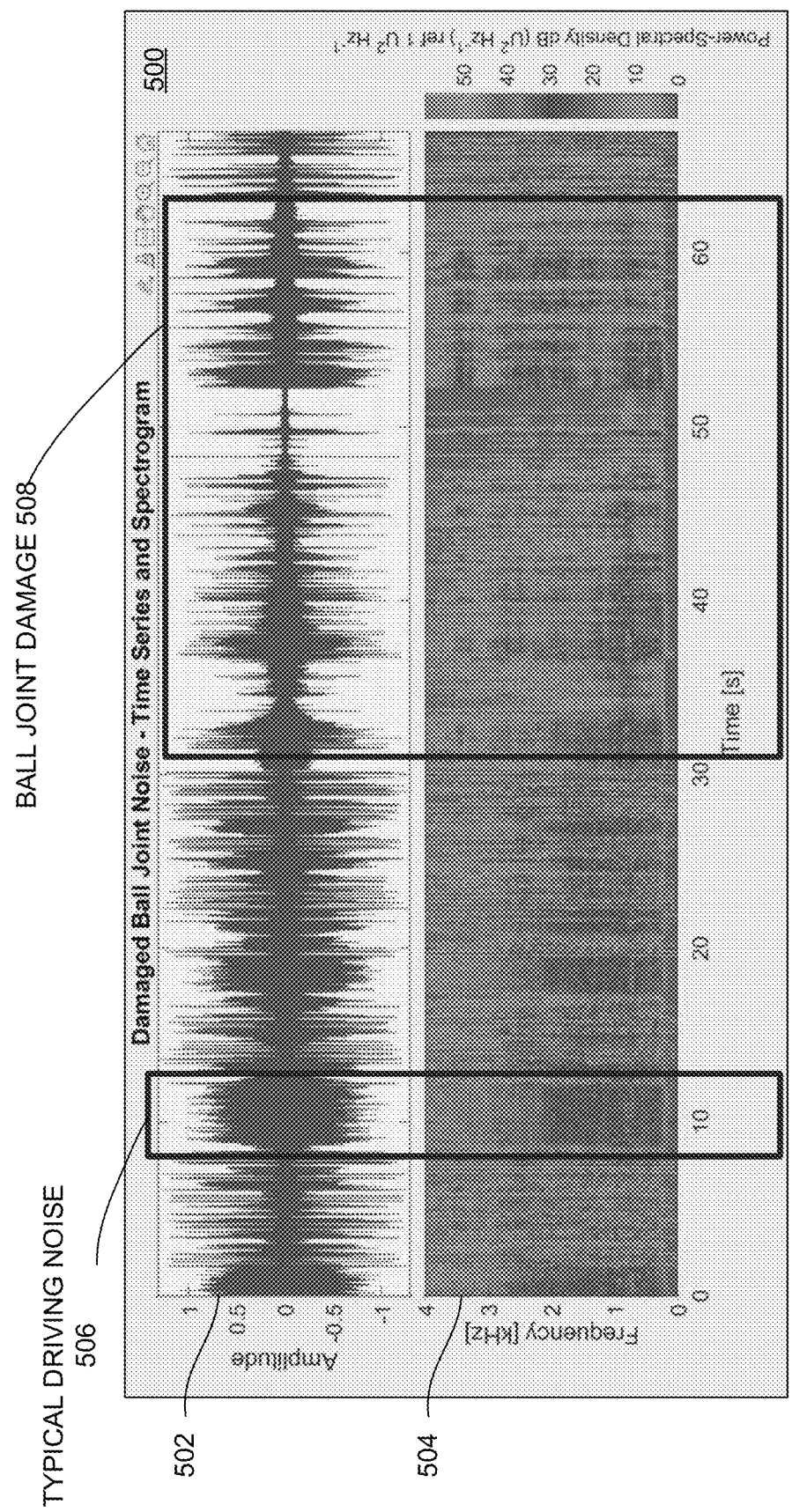
FIG. 5 is a graph of ball joint noise, according to some embodiments.

FIG. 5 is a graph of ball joint noise, according to some embodiments.

Graph 500 can be generated by processing logic that can comprise hardware (e.g., circuitry, dedicated logic, programmable logic, microcode, etc.), software (e.g., instructions, or a combination thereof. The processing may be performed locally (within the vehicle) or remotely in cloud-based processors.

Graph 500 shall be described with reference to FIGS. 1-4. However, graph 500 is not limited to that example embodiment.

Graph 500 includes a time series 502 of damaged ball joint noise amplitude. In addition, graph 500 includes a spectrogram 504 of damaged ball joint noise. A spectrogram is a visual representation of the spectrum of frequencies of a signal as it varies with time.

Time series 502 reflects a time-period around ten seconds where typical driving noise 506 is captured (recorded) as well as a time-period approximately 30-65 seconds where ball joint damage is captured. Bands 2.5 and 3.5 kHz (but not limited thereto) reflect example frequency bands where damaged ball joints may be detected by analyzing the spectrogram. These bands are where changes in intensity increase (spike) in this sample of data. By band-limiting data (e.g., band-pass filtering (BPF)) to specific frequency bands where known damage is commonly revealed, the ball joint noise may be detected within these specific bands.

The suspension being tested with a damaged ball joint shows an impulsive artifact where the frequencies have higher power spectral density for a short time.

Figure 6:
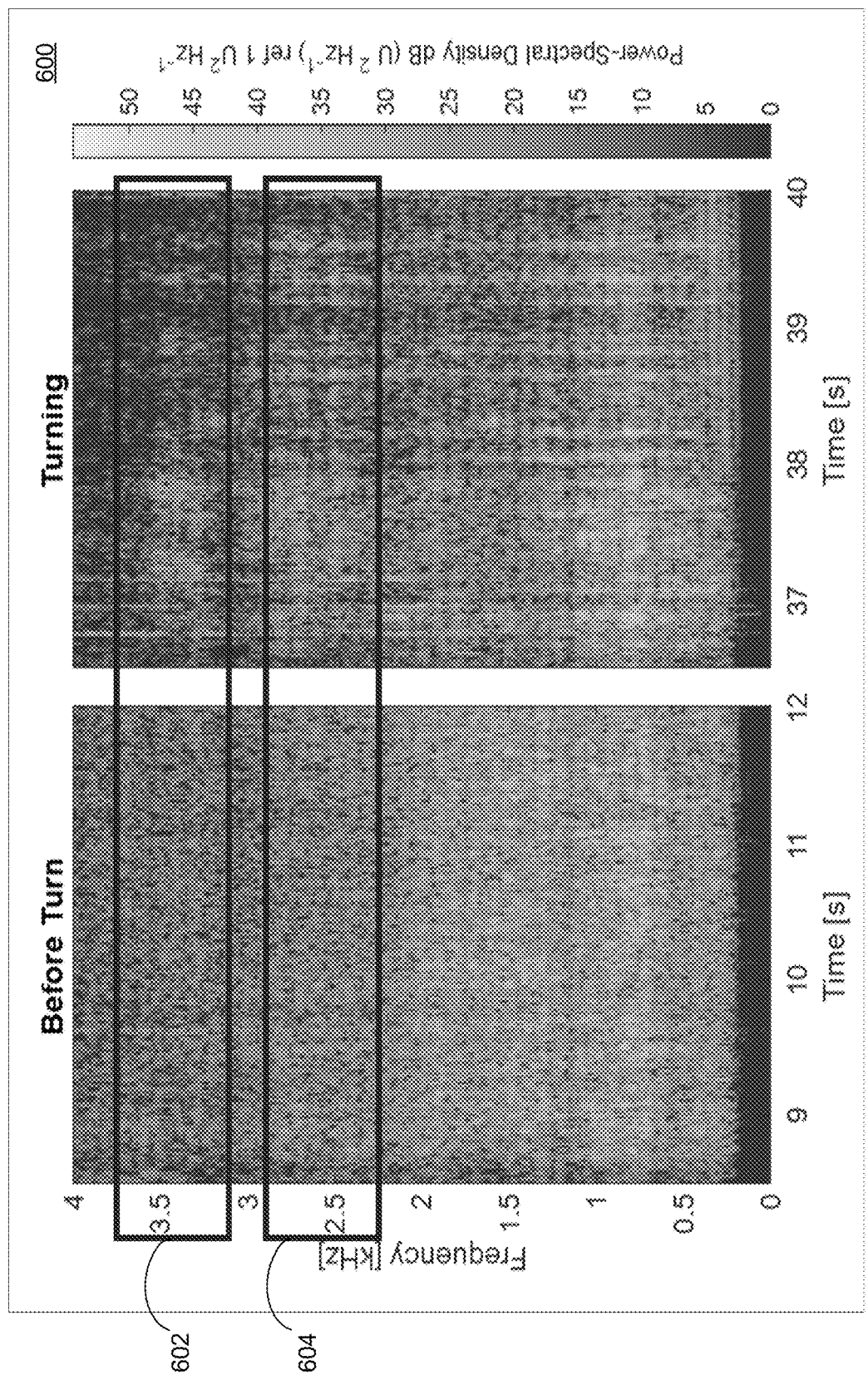
FIG. 6 is a spectrogram of ball joint noise, according to some embodiments.

FIG. 6 is a spectrogram of ball joint noise, according to some embodiments.

Spectrogram 600 can be generated by processing logic that can comprise hardware (e.g., circuitry, dedicated logic, programmable logic, microcode, etc.), software (e.g., instructions, or a combination thereof. The processing may be performed locally (within the vehicle) or remotely in cloud-based processors.

Spectrogram 600 shall be described with reference to FIGS. 1-4. However, Spectrogram 600 is not limited to that example embodiment.

As shown, artifacts appear in the 2.5 kHz and 3.5 kHz ranges. The suspension being tested with a damaged ball joint shows an impulsive artifact where the frequencies have higher power spectral density for a short time. A wheel turning also reveals artifacts of harmonics, some frequencies but not all, having higher spectral density and changing over time, as the tire is turned.

These artifacts may indicate a damaged ball joint. Before the turn we know that the spectrogram has more uniform noise for all the frequencies over time. However, while turning, the damaged ball joint is being aggravated and the intensities of frequencies change becoming louder and less uniform.

Figure 7:
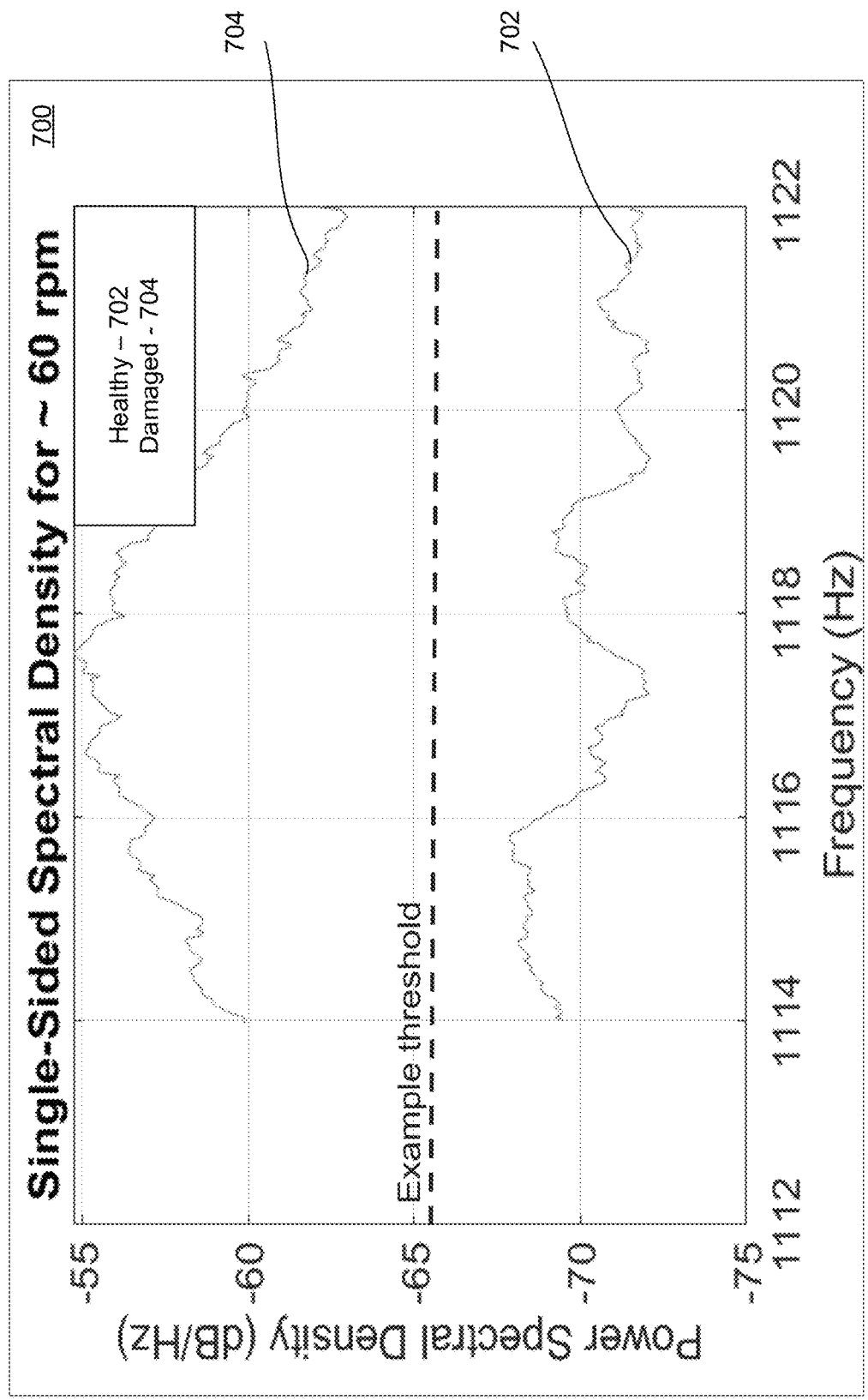
FIG. 7 is a spectrogram of ball joint noise, according to some embodiments.

FIG. 7 is a spectrogram of ball joint noise, according to some embodiments.

Spectrogram 700 can be generated by processing logic that can comprise hardware (e.g., circuitry, dedicated logic, programmable logic, microcode, etc.), software (e.g., instructions, or a combination thereof. The processing may be performed locally (within the vehicle) or remotely in cloud-based processors.

Spectrogram 700 shall be described with reference to FIGS. 1-4. However, Spectrogram 700 is not limited to that example embodiment.

Spectrogram 700 illustrates a power spectral density distribution from 1112 Hz to 1122 Hz. As shown, a single-sided spectral density at 60 Revolutions Per Minute (RPM) illustrates a healthy ball joint 802 below a threshold power spectral density of −65 dB/Hz and a damaged ball joint 804 above −65 dB/Hz. While shown at −65 dB/Hz, the threshold may vary from suspension to suspension, gross vehicle weight, road surface quality, temperatures (e.g., summer vs. winter), etc.

Figure 8:
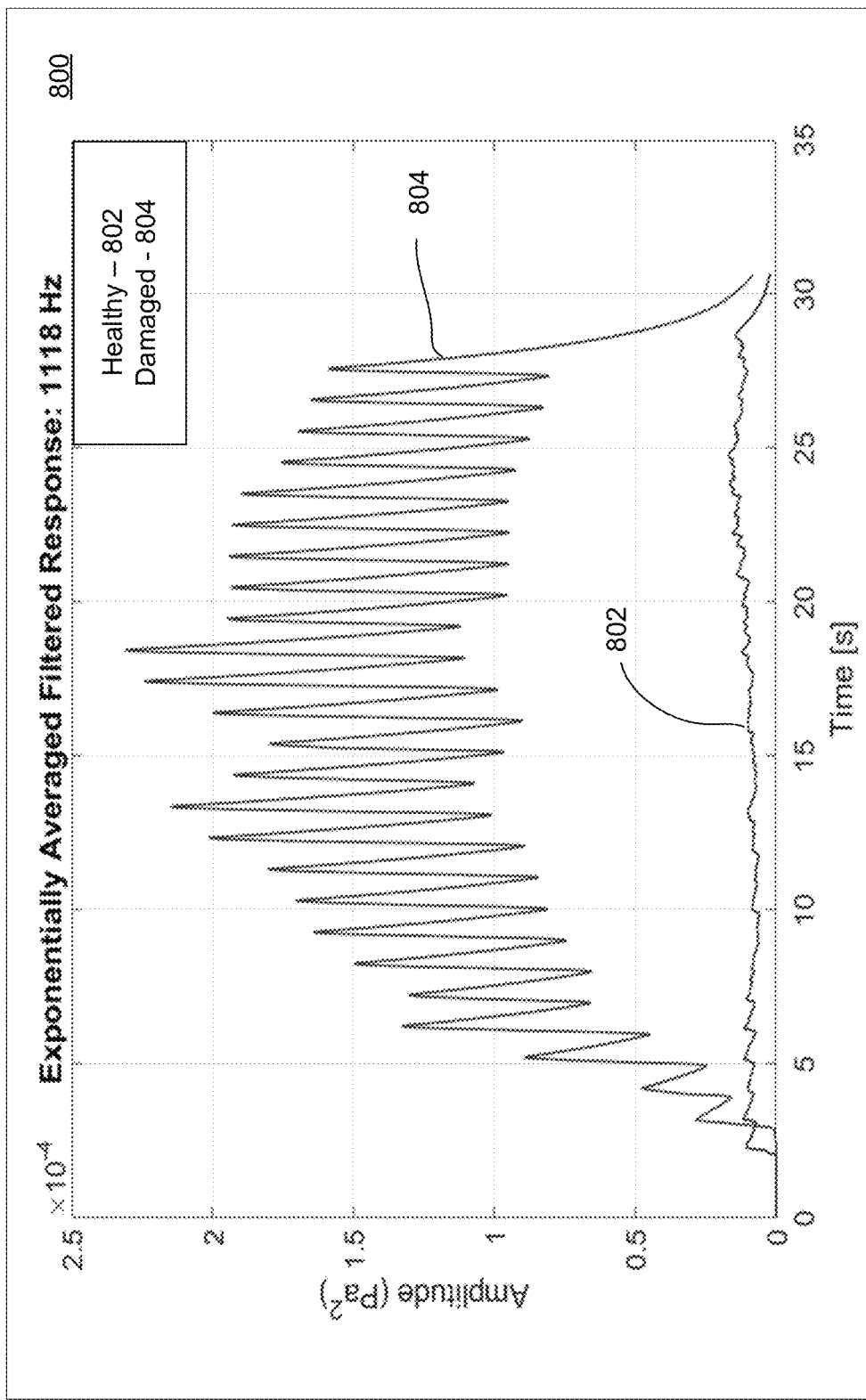
FIG. 8 is a graph of ball joint noise, according to some embodiments.

FIG. 8 is a graph of ball joint noise, according to some embodiments.

Graph 800 can be generated by processing logic that can comprise hardware (e.g., circuitry, dedicated logic, programmable logic, microcode, etc.), software (e.g., instructions, or a combination thereof. The processing may be performed locally (within the vehicle) or remotely in cloud-based processors.

Graph 800 shall be described with reference to FIGS. 1-4. However, graph 800 is not limited to that example embodiment.

Graph 800 illustrates an exponential averaged filtered response at 1118 Hz. As shown, over time, as sound amplitude pressure changes, damaged ball joints 804 are detected above 0.5 $Pa^2$ (Pascal-squared). Healthy ball joints have distinguishable lower amplitudes, in the 0-0.1 $Pa^2$ range.

Figure 9:
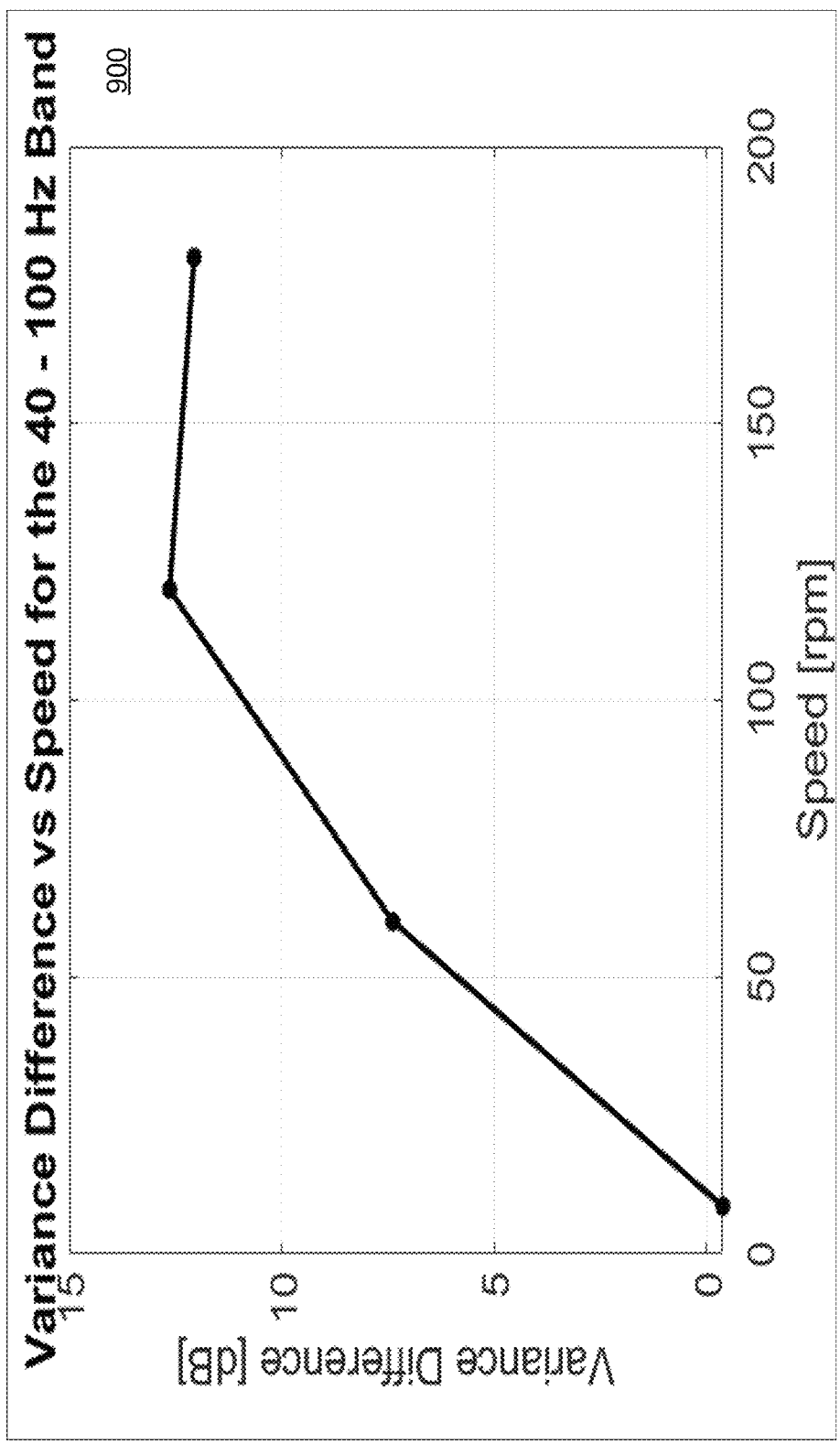
FIG. 9 is a graph of ball joint noise, according to some embodiments.

FIG. 9 is a graph of ball joint noise, according to some embodiments.

Graph 900 can be generated by processing logic that can comprise hardware (e.g., circuitry, dedicated logic, programmable logic, microcode, etc.), software (e.g., instructions, or a combination thereof. The processing may be performed locally (within the vehicle) or remotely in cloud-based processors.

Graph 900 shall be described with reference to FIGS. 1-4. However, graph 900 is not limited to that example embodiment.

As shown, a variance difference between healthy and damaged ball joints (40-100 Hz band) increases up to around 120 revolutions per minute (RPM) and then essentially levels off (with a slight decline). As shown, recording sounds at higher speeds may increase detectability (up to a point of diminishing return (e.g., around 120 RPM)).

Benefits of the technology described herein include, but are not limited to, cost reductions through less downtime due to repairs because of failure localization and automated parts orders, risk reduction through lower risk of loss due to catastrophic failure.

Figure 10:
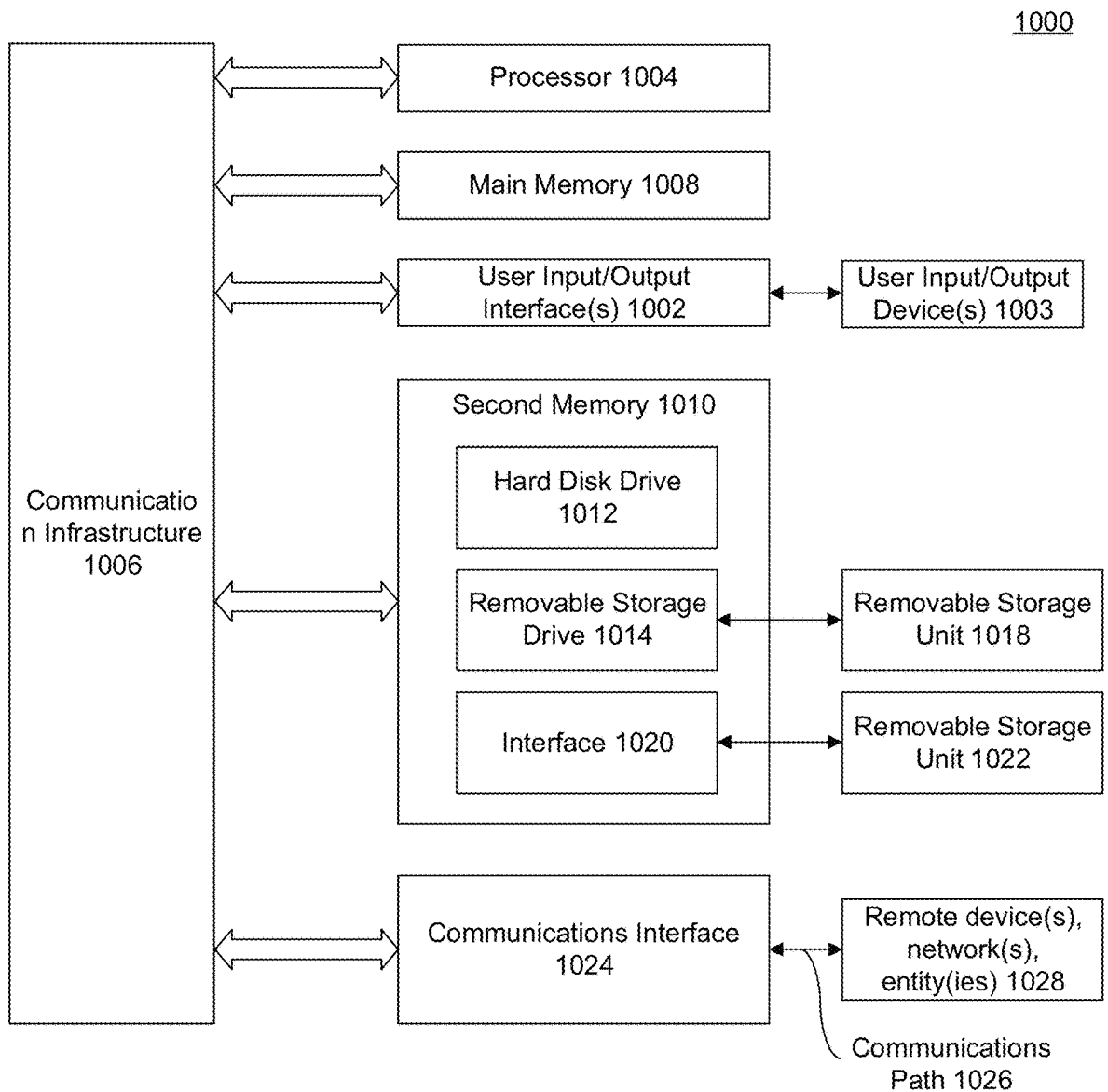
FIG. 10 is an example computer system useful for implementing various embodiments.

Various embodiments may be implemented, for example, using one or more computer systems, such as computer system 1000 shown in FIG. 10. Computer system 1000 can be used, for example, to implement method 300 of FIG. 3. Computer system 1000 can be any computer capable of performing the functions described herein.

Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics-processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure or bus 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in microSD), a removable memory chip (such as an EPROM, EEPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for vehicle mechanical component wear detection, comprising:
   receiving, by at least one processor, acoustic signals of a vehicle;
   processing, by the at least one processor, the acoustic signals to generate training data, the processing comprising:
     filtering, by band-pass filters, the acoustic signals;
     comparing, based on a spectral density, the filtered acoustic signals to known filtered acoustic signals to identify altered acoustic signals; and
     labeling the altered acoustic signals with a corresponding vehicle mechanical component wear level;
   training, based on the training data, a predictive learning algorithm to generate a predictive vehicle mechanical component wear model;
   classifying, by the predictive vehicle mechanical component wear model, the processed acoustic signals to indicate wear levels of one or more vehicle mechanical components; and
   wherein at least one of the receiving, processing, training and classifying are performed by one or more computers to predict the corresponding vehicle mechanical component wear levels.

2. The computer-implemented method of claim 1, the receiving further comprising:
   capturing the acoustic signals from any of pre-stored acoustic data, microphones, acceleration sensors or Micro ElectroMechanical System (MEMS) devices.

3. The computer-implemented method of claim 1, the receiving further comprising:
   continuously monitoring live acoustic signals generated by a vehicle frame or vehicle sub-frame of a vehicle suspension system.

4. The computer-implemented method of claim 3, wherein the live acoustic signals comprise:
   ball joint acoustic signatures.

5. The computer-implemented method of claim 4, wherein the ball joint acoustic signatures comprise:
   ball joint acoustic signatures altered by physical damage.

6. The computer-implemented method of claim 1, the comparing the filtered acoustic signals further comprising:
   comparing the spectral density of each of a plurality of frequency ranges to the known filtered acoustic signals in a same frequency range.

7. The computer-implemented method of claim 1, the training further comprising:
   tuning the predictive vehicle mechanical component wear model based on evaluation metrics.

8. The computer-implemented method of claim 7, wherein the evaluation metrics include any of:
  accuracy, precision, recall, or area under a receiver operating characteristics (ROC) curve.

9. The computer-implemented method of claim 1, further comprising:
  receiving, by a classifier, newly captured acoustic signals of another vehicle mechanical component and predicting, based on the predictive vehicle mechanical component wear model, the wear levels within a range of values.

10. The computer-implemented method of claim 1, wherein the training data comprises:
  a supervised training data set with a sound signal as an input vector and level of wear as an output teacher vector.

11. A system, comprising:
  a memory; and
  at least one processor coupled to the memory and configured to:
    receive acoustic signals of vehicle mechanical components;
    process the acoustic signals to generate an acoustic signature, the processing comprising:
    filtering, by band-pass filters, the acoustic signals;
    comparing, based on a spectral density, the filtered acoustic signals to known filtered acoustic signals to identify altered acoustic signals as the acoustic signature; and
    labelling the altered acoustic signals with a corresponding vehicle mechanical component wear level;
    train a predictive machine learning wear model with the acoustic signature;
    process live vehicle mechanical component acoustic signatures with the predictive machine learning wear model to infer wear levels of one or more of the vehicle mechanical components; and
    communicate the wear levels to a cloud-based repository.

12. The system of claim 11, wherein the at least one processor is configured to receive the acoustic signals from any of pre-stored acoustic data, microphones, acceleration sensors or Micro ElectroMechanical System (MEMS) devices.

13. The system of claim 11, wherein the at least one processor is further configured to:
  continuously monitor the live vehicle mechanical component acoustic signals as generated by a vehicle frame or vehicle sub-frame of a vehicle suspension system.

14. The system of claim 13, wherein the monitored acoustic signals of the vehicle suspension system originate from a driverless vehicle.

15. The system of claim 11, wherein the acoustic signals comprise:
  ball joint acoustic signatures.

16. The system of claim 15, wherein the ball joint acoustic signatures comprise:
  ball joint acoustic signatures altered by physical damage.

17. The system of claim 11, wherein the at least one processor is further configured to communicate only wear levels above a failure threshold.

18. A non-transitory computer-readable device having instructions stored thereon that, when executed by at least one computing device, cause the at least one computing device to perform operations comprising:
  receiving acoustic signals of vehicle mechanical components;
  processing the acoustic signals to generate an acoustic signature, the processing comprising:
  filtering, by band-pass filters, the acoustic signals;
  comparing, based on a spectral density, the filtered acoustic signals to known filtered acoustic signals to identify altered acoustic signals as the acoustic signature; and
  labelling the altered acoustic signals with a corresponding vehicle mechanical component wear level;
  training a predictive machine learning wear model with the acoustic signature;
  processing live vehicle mechanical component acoustic signatures with the predictive machine learning wear model to infer wear levels of one or more of the vehicle mechanical components; and
  communicating the wear levels to a cloud-based repository.

* * * * *